United States Patent [19]

Simon et al.

[11] 3,961,194
[45] June 1, 1976

[54] TRACKING AND DISPLAY APPARATUS FOR HEAT-DETECTING SYSTEMS

[75] Inventors: Karl-Heinz Simon, Oberkochen; Hans-Richard Weinheimer, Koningsbronn, both of Germany

[73] Assignee: Carl Zeiss-Stiftung, Oberkochen, Germany

[22] Filed: Nov. 30, 1972

[21] Appl. No.: 311,904

[52] U.S. Cl. ............................ 250/334; 250/333
[51] Int. Cl.² .................................. H01J 31/49
[58] Field of Search ............... 250/333, 334, 366

[56] References Cited
UNITED STATES PATENTS

| | | | |
|---|---|---|---|
| 2,776,377 | 1/1957 | Anger | 250/366 |
| 2,974,230 | 3/1961 | Harris | 250/334 |
| 3,128,380 | 4/1964 | Nirschl | 250/366 |
| 3,597,617 | 8/1971 | Passaro | 250/334 |
| 3,652,855 | 3/1972 | McIntyre et al. | 250/366 |

*Primary Examiner*—T.H. Tubbesing
*Assistant Examiner*—S. C. Buczinski
*Attorney, Agent, or Firm*—Nichol M. Sandoe

[57] ABSTRACT

The invention contemplates improvement in the interpretability of heat-detection data, resulting from scanning a field. One or more heat-detecting devices are caused to scan the field and to create light modulation, superposed on a monitoring display of the field, the monitoring display being the product of observing the field in a band (e.g. visible light) other than that of the scanned heat response. The result is to superpose on the monitoring display brightened light modulations in accordance with heat sources encountered in the course of heat scanning the same field.

17 Claims, 5 Drawing Figures

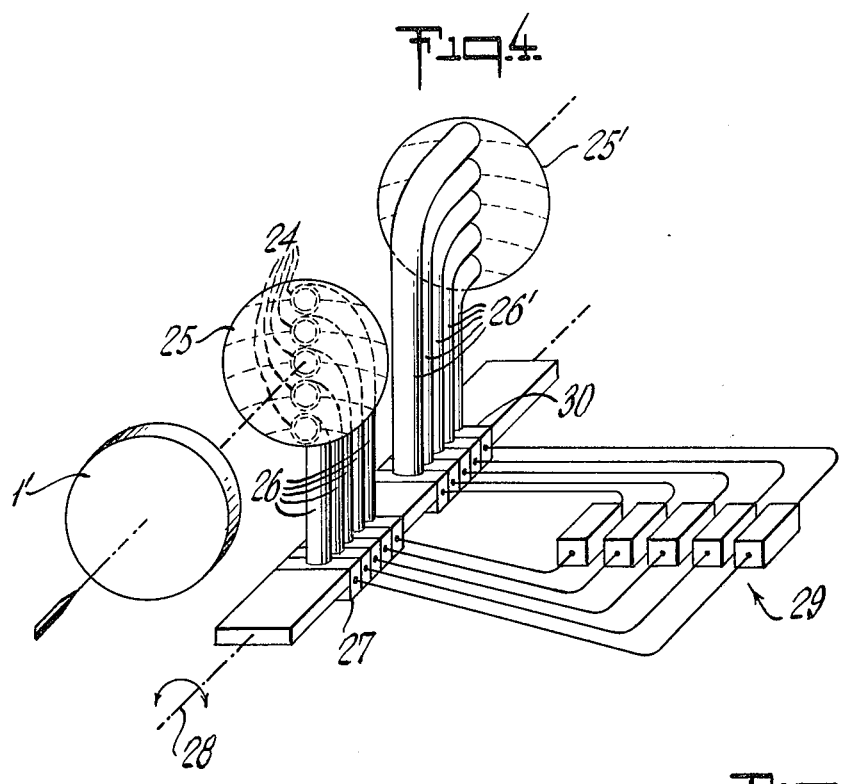
Fig. 4.
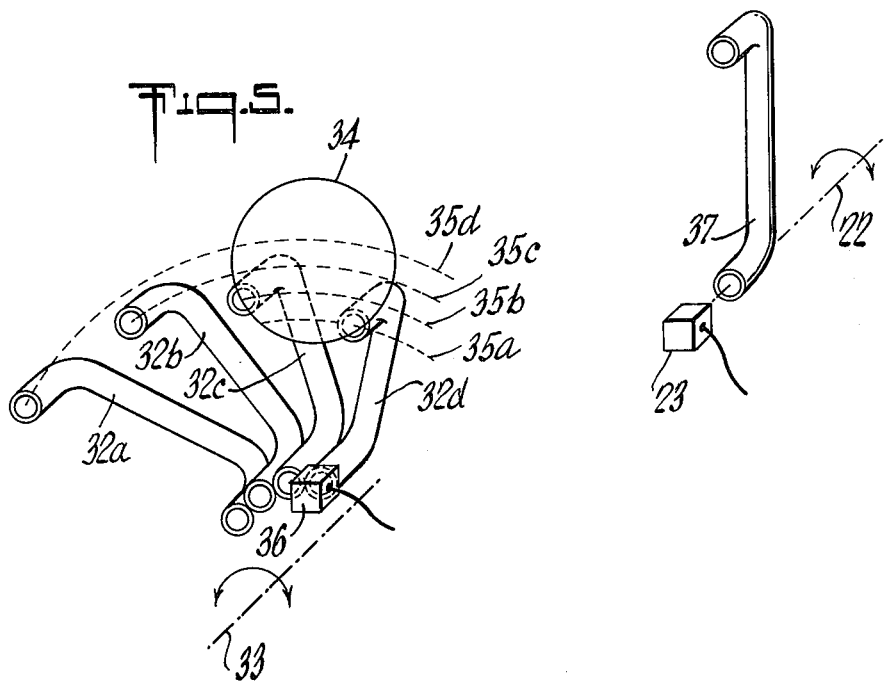
Fig. 5.
Fig. 3.

TRACKING AND DISPLAY APPARATUS FOR HEAT-DETECTING SYSTEMS

This invention relates to a method and means for quantitative and/or qualitative evaluation of electromagnetic radiation, especially for use in telemetering and display of detected heat orientations and/or pictures, in optical display systems for daytime or nighttime use, wherein different wavebands (for example, in the infrared and in the visible) are simultaneously used.

Such apparatus uses a heat detector or heat-orientation device (array of heat detectors) to develop heat-sensed intelligence in point, line or surface form. And, if the target radiation is observed in the longwave region of the infrared spectrum (far-infrared), there may be a further observation of the ascertainable location or orientation, coordinated with that of a monitoring device for observing the target in the visible and/or near-infrared regions of the spectrum. For an exact recognition or identification of the target, it is necessary to establish the most ideal spectral separation of the different operative wavelength regions and to reduce as far as possible the deleterious radiation effects of reflection, absorption and scattering.

For most effective target observation, for example, in a landscape, various combinations of apparatus are known in which picture-amplifying, picture-transforming or television devices, equipped with heat-detection means or the like, are coupled together in accordance with the specific properties of the target sought. In these known combinations the different characteristic spectral regions of the target are directed by means of spectral dividing devices (e.g. interference filters, as described in German Pat. No. 1,230,592) to different spectrally limited detectors, which produce electrical signals for corresponding components of the received radiation. With such spectral dividing devices, however, significant degradation of the radiation is caused as a consequence of reflection, absorption and scattering. Particularly large spectral components degrade the technical quality of the display, leading in general to "coloring" in the picture, since ideal spectral separation is not achieved.

The invention, therefore, has as its object to provide an apparatus of the character indicated which, through a combination of a heat-detecting system with a known day or night field monitoring or observation system, and at small technical expense, will assure a better separation of the spectral regions and which, at the same time, will substantially reduce degradation of the incoming radiation.

According to the invention, this object is achieved (a) by providing, in or near the image surface of an optical system, one or more movable heat-radiation detectors, (b) by coupling the movable means of the heat detectors with synchronizing or position-tracking means to control the path of movement or for remote transmission, (c) by synchronously coupling the movements of one or more such detectors with those of corresponding light sources of a recreated display, wherein brightness is determined by detector response to heat radiation, and (d) by projecting light-source movement in the desired information-evaluating plane of the monitoring system.

In an advantageous illustrative embodiment of the invention, the heat-radiation detectors and the display light sources are fixedly related and are movable over given scan paths which may be arcuate or linear.

In another illustrative embodiment of the invention, heat-radiation detectors are combined with radiation reflectors or conductors which develop the heat-scan response in the image field of the monitoring system, the reflectors or conductors conveying the scanned heat radiations to their associated detectors, the latter being fixedly mounted or movably carried with scanning motion. This embodiment is particularly useful in that the complications of flexible cables, tracking contacts, etc. can be avoided in relating the detectors to the movable parts of the apparatus.

Fiber-optical elements may be advantageously used as radiation conductors.

Also, advantageously, hollow conductors are available from microwave technology to conduct heat radiation to the detectors. Such hollow conductors provide reflective inner wall surfaces and are totally or partially filled with dielectric material, and they are available with variable-length and twistable features.

The indicated radiation conductors may also be flexible if necessary.

Analogous to the radiation conductors used in conjunction with the heat-radiation detectors, it is desirable and advantageous to employ reflecting or conducting means at a given station in the monitoring-display end of the system, in conjunction with the modulated light sources. Such a station may, for example, be an intermediate image surface of a telescope system, or the input surface of an image-converter, of an image-intensifier or a television-camera tube. Also, the plane behind the light screen of an image-converter or image-intensifier tube or of a monitor, as well as one or more intermediate image planes in a magnifying system can be convenient locations for superposing the light-source display information. It is also possible to introduce such information electronically, by super-position on the video signal of the monitoring display.

The invention permits use of relative movement between a movably mounted radiation conductor and a movably mounted heat-radiation detector, and between the detector and the light source of the display. Such relative movement may be compensated through slidable telescoping (trombone-like) hollow conductor sections or through a dielectric radiation conductor combined with a hollow conductor of variable length.

The invention also contemplates an embodiment, in which a single heat-radiation detector sequentially serves radiation conductors scanning one or more parts of the imaged field.

Likewise, it is possible and advantageous that a multiple-element heat-detector array may be fixedly mounted in the image field or relative to the image field.

Also, the invention lends itself to the combination of different known radiation conductor elements and known principles of motion for supporting the heat detectors, the light sources and the radiation conductors.

The particular advantage of the invention is that, at relatively small technical expense, the radiation losses through reflection, scattering, and absorption are reduced, and the heat-detecting apparatus can be at rest when not needed, the same being arrested with the scanning heat-detecting means and with the light-source means at or outside a border of the image field. If necessary, the supporting arm(s) for the heat detector and/or the display light source can be so rapidly moved that concurrent viewing of the remainder of the display is not spoiled.

The invention will be described in further detail with illustrative examples, in conjunction with the accompanying drawings. In these drawings:

FIG. 3 is a similar view of another modified apparatus, in which light rays are conducted from a fixed light source to an offset location for information display;

FIG. 4 is a similar view for a further embodiment in which heat-target orientation within a surface is scanned by plural radiation conductors, and wherein the number of heat-radiation detectors is matched by a corresponding number of light sources in the remote or offset display; and FIG. 5 is a similar view of a modification wherein a single heat-radiation detector is caused to scan for heat-target orientation in a surface, using a plurality of radiation conductors.

Figure 1:
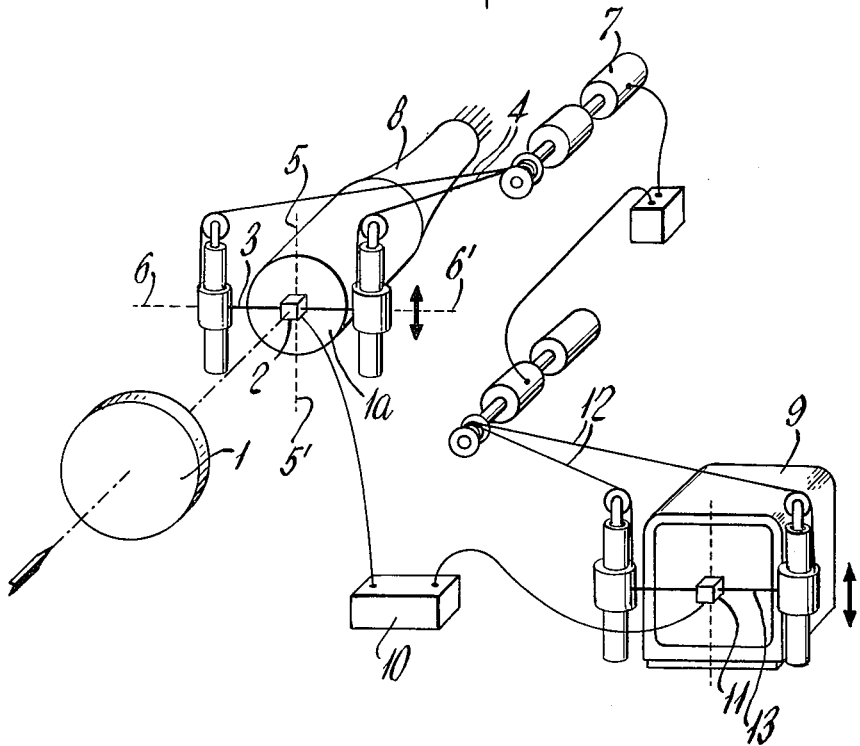
FIG. 1 is a simplified view in perspective schematically showing apparatus of the invention in which a heat-radiation detector is movably positioned in the picture (image) surface of a television camera.

In FIG. 1, a heat-radiation detector 2 is carried by slide means 3 and is positionable by drive means 4 along an axis 5–5' in the picture or image surface 1a of an imaging system 1; the movement may be for a single scan or for repeated scans. The direction 5–5' is, for example, vertical in the image field, and it may perpendicularly intersect the optical axis. Alternatively, and depending upon use requirements, it will be understood that the detector 2 can be supported for horizontal movement, as along the axis 6–6'. A position-sensing device 7 is shown as part of the drive means 4. In the illustrative case of FIG. 1, target monitoring is accomplished by a television camera 8 and associated remote-display apparatus 9. Remote indication of target heat-source data from the detector 2 uses a light source 11, driven by an amplifier 10 of the electrical output of detector 2. Source 11 is controlled for brightness, for example, when the detector in the image surface responds to a heat source in the target region. Movement of the light source 11 is controlled by means 12 and the device 7, for synchronism with movement of detector 2 in the image surface. Thus, the monitoring display of the remote apparatus 9 and the heat-target orientation information are coupled to each other, in superposed registration. By providing sufficiently rapid coordinated scanning movements of detector 2 and light source 11, and by providing relatively thin slide structure at 3 and 13 (in front of the camera surface 1a and in front of the display surface of monitor 9, respectively), these parts of slides 3 and 13 are not noticeable to the eye, and the observer perceives the impression of a standing light, modulated in its brightness in accordance with heat sources detected along the line of heat-detector scan movement in the image field. Through selection of a light-source color which is in suitable contrast to that of the monitor-display screen, the heat-orientation data can be depicted with clarity against the monitor field. Alternatively, if desired, it will be understood that the heat-signal data can be electronically injected into the remote television monitor, for simultaneous presentation with the display field.

Figure 2:
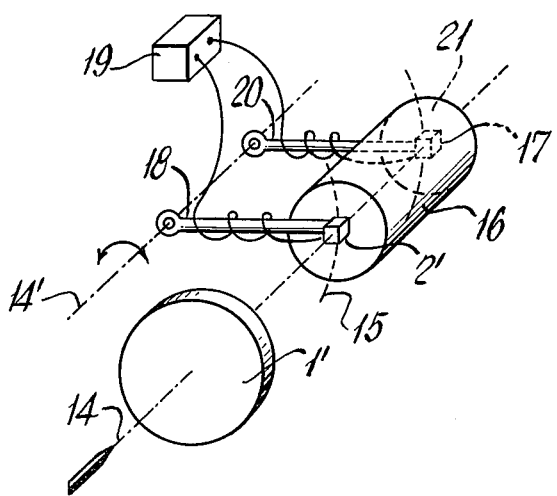
FIG. 2 is a similar view of modified apparatus, in which a heat-radiation detector is radially movable in the image surface of a telescope.

In the illustrative embodiment of FIG. 2, a heat-radiation detector 2' is carried by a supporting arm 18, in or near the image plane of the optical system 1'. Arm 18 is movably positioned about an axis 14' offset from the image area and parallel to the optical axis 14. Detector 2' is thus movable over an arcuate path 15 and is responsive to radiation scanned over this path. The described heat-scanning apparatus is, in the form shown, coordinated with telescope means including a two-stage picture-amplifying tube 16. Brightness of a remote light source 17 is controlled in accordance with the output of detector 2', as amplified at 19, and light source 17 is carried by a supporting arm 20, directly adjacent the tube-lighted screen 21. The support arms 18-20 may be fixed to the same rotary shaft on axis 14', so that source 17 synchronously tracks movement of detector 2', and the observer of screen 21 sees brightness fluctuations in accordance with heat scanning along the path 15. It will be understood that, if desired, the remote light source 17 can also be carried by the same positioning arm 18 as used to support detector 2', in which case source 17 is directly in front of the input plane of the picture-amplifying tube 16; or, in the case of a remote-display tube having geometrical optics, the light source 17 may be thus supported at an intermediate image plane, with appropriate orientation in accordance with image orientation at the image plane. It will also be understood that the embodiment of FIG. 2 lends itself to remote transmission of the scan motion, and to a displayed inversion of the scan motion, as appropriate to the orientation of the monitor display.

In the schematic showing of FIG. 3, a remote light source 23 is aligned with one end of a light conductor 37, the latter being rotatable about the alignment axis 22 and so formed as to conduct light to the observation station. The light conductor 37 may be a fiber conductor or hollow reflective conductor, of round or rectangular cross-section. Also, a hollow conductor of variable length and known construction, and various combinations of fiber and hollow conductors, may be used.

The schematic arrangement of FIG. 4 represents a modification of FIG. 2 wherein the image surface is wholly or partly scanned by the input ends 24 of a plurality of radiation conductors 26, which are supported for bodily movement along concentric paths about a rotary axis 28, offset from and parallel to the axis of optical system 1'. Heat-radiation detectors 27 respond to the different heat outputs of conductors 26 and may be fixed or, as shown, are movable in unison with conductors 26 (about axis 28). Amplifiers 29 accept the different electrical outputs of detectors 27 and supply suitable input levels to the respective corresponding light sources 30, from which the coordinated light modulations are conveyed by light-conducting means 26' to the desired image plane 25' of the monitoring system.

In the schematic arrangement of FIG. 5, plural radiation conductors 32a to 32d extend radially of and are bodily displaced about the rotary axis 33. They scan the image field 34 along concentric paths 35a to 35d and serve the same detector. Conductors 32a to 32d are in such angularly spaced relation with respect to the length of paths 35a to 32d at field 34 that at any instant of time detector 36 will respond to heat scanned along only one of the paths 35a to 32d.

The invention may also be applied, with an improved geometrical solution, in a combination of the techniques shown in FIGS. 4 and 5, as to heat-target orientation and heat-radiation conduction.

What is claimed is:

1. Apparatus for the quantitative and/or qualitative detection and display of infrared radiation for daytime and nighttime use, wherein separate responses in a visible waveband and in an infrared waveband are used simultaneously in a single display, comprising optical means for imaging a field of view at an image surface; first means including a visible-waveband detector at said surface for visually displaying the visible-waveband response to said field at a display surface; second means including a scanning system with an infrared-sensitive detector element responsive to a part of said field near said image surface, for generating an electrical signal in accordance with scan action in said image surface; scan-tracking means tracking instantaneous scan action within the image surface; said display means including means responsive to said electrical signal for locally enhancing the visible character of the visible-waveband display at the display surface in accordance with the instantaneous magnitude of infrared response; and a synchronizing connection from said scan-tracking means and coordinated with the field display at said display surface for effectively superposing, upon said visible-waveband display, the infrared-responsive local visually enhanced modulation in accordance with instantaneous scan location within said image surface.

2. Apparatus according to claim 1, wherein said enhancement means includes a light source and means modulating the brightness thereof in accordance with the instantaneous magnitude of infrared response.

3. Apparatus according to claim 2, in which said light source is of a color characteristic differing from that of the display of said first means.

4. Apparatus according to claim 2, in which the infrared-sensitive system includes means supporting said detector element for scan movement along a given path in said image surface, said light source being similarly supported for movement along a corresponding path in the display surface.

5. Apparatus according to claim 4, in which said supporting means comprises radial-arm means, mounted for rotation about an axis offset from and parallel to the axis of said optical means whereby scan and display paths for infrared response and light-modulated display are arcuate.

6. Apparatus according to claim 4, in which the coordinated scan and display paths for infrared response and light-modulated display are rectilinear.

7. Apparatus according to claim 1, in which said infrared-sensitive detector element is offset from the image surface, a radiation conducting element coupling the response of said detector element to a part of the field radiation incident at the image surface, and means imparting scanning movement to the part of the conducting element which is exposed to field radiation incident at the image surface.

8. Apparatus according to claim 7, in which said detector and conducting elements are fixedly related to each other, being movable in unison in the course of scan motion.

9. Apparatus according to claim 7, in which said detector element is fixed relative to scanning movement at the image surface.

10. Apparatus according to claim 7, in which said radiation conductive element is a fiber-optical element.

11. Apparatus according to claim 7, in which said radiation conductive element includes a reflective surface.

12. Apparatus according to claim 7, in which said detector element is one element of an array of infrared-sensitive detecting elements, and separate radiation-conducting elements separately coupling the response of each detecting element to a different part of the field of radiation incident at the image surface, the orientation of said conducting elements being such as to scan different paths in the image surface in the course of scan movement.

13. Apparatus according to claim 7, in which said conducting element is one of a plurality of conducting elements having first spaced ends in the plane of said image surface and second spaced ends in a plane normal to the infrared-sensitive detector-response axis, said spacings being such as to sequentially commutate infrared detector response via different conductors to field radiation at the image surface.

14. Apparatus according to claim 13, in which the first ends of said conducting elements are at different offsets generally transverse to scan motion so that each conducting element causes said detector element to respond to a different scan path in the field of radiation incident at the image surface.

15. Apparatus according to claim 7, in which said conducting element is flexible.

16. Apparatus according to claim 2, in which said light source is offset from the display surface, a light-conducting element having an output end and coupling light output of said source to a part of the field of the display surface, and means controlled by said synchronizing connection for positioning said end of said light-conducting element in said display surface.

17. Apparatus for daytime or nighttime use and for the quantitative and/or qualitative simultaneous detection and display of electromagnetic radiation in two different wavebands which are respectively in the visible and in the infrared; said apparatus comprising optical means for imaging a field of view at an image surface; first detector means at said image surface and electrically responsive to radiation in a first waveband in the visible, said detector means including means for visually displaying the visible-waveband response to said field at a display surface; second detector means including a scanning system with an element movably positioned near said image surface and having an electrical response to radiation of a second waveband in the infrared, for generating an infrared-responsive electrical signal in accordance with movement of said element over a predetermined scan path in said image surface; scan-tracking means tracking instantaneous scan movement of said element over said path, said display means including means responsive to said electrical signal for locally enhancing the visible character of the visible-waveband display at the display surface in accordance with the instantaneous magnitude of detector-element response to radiation in the infrared waveband; and a synchronizing connection from said scan-tracking means and coordinated with the visible-waveband display field for effectively superposing the local visually enhanced display of infrared-waveband response on said visible-waveband display.

* * * * *